United States Patent [19]

Halverson et al.

[11] Patent Number: 5,330,222
[45] Date of Patent: Jul. 19, 1994

[54] FRAME ISOLATOR FOR TERMINAL TRACTOR

[75] Inventors: Merlin B. Halverson, Lawrence, Kans.; Raymond J. Carter, Troy, Mo.

[73] Assignee: Ottawa Truck, Inc., Ottawa, Kans.

[21] Appl. No.: 27,712

[22] Filed: Mar. 8, 1993

[51] Int. Cl.⁵ .................... B62D 53/06; B60G 11/22
[52] U.S. Cl. .................... 280/438.1; 280/716
[58] Field of Search .................. 280/423.1, 425.1, 433, 280/434, 437, 438.1, 439, 440, 441, 688, 711, 713, 716, 725; 180/353, 354, 378

[56] References Cited

U.S. PATENT DOCUMENTS

| | | | |
|---|---|---|---|
| 2,536,337 | 1/1951 | Whitlow | 280/719 |
| 2,746,766 | 5/1956 | Nallinger | 280/725 |
| 2,847,230 | 8/1958 | Hendrickson et al. | 280/407.1 |
| 2,968,496 | 1/1961 | Gouirand | 280/439 |
| 3,081,109 | 3/1963 | Davies et al. | 280/423.1 |
| 3,207,338 | 9/1965 | Felburn | 280/438.1 X |
| 3,315,980 | 4/1967 | Gorge et al. | |
| 3,347,563 | 10/1967 | Harbers | 280/425.1 |
| 3,494,632 | 2/1970 | Bostrom | |
| 3,732,942 | 5/1973 | Hobbensiefken | |
| 3,746,363 | 7/1973 | Borns | |
| 4,029,335 | 6/1977 | Cady et al. | |
| 4,111,273 | 9/1978 | Blackburn et al. | |
| 4,248,447 | 2/1981 | Hart | 280/713 X |
| 4,309,045 | 1/1982 | Raidel | 280/711 |
| 4,379,572 | 4/1983 | Hedenberg | |
| 4,391,455 | 7/1983 | Fagerstedt | 280/438.1 X |
| 4,518,171 | 5/1985 | Hedenberg | 280/711 |
| 4,541,653 | 9/1985 | Raidel | |
| 4,566,716 | 1/1986 | Modat | |
| 4,718,692 | 1/1988 | Raidel | |
| 4,722,549 | 2/1988 | Raidel | |
| 4,762,337 | 8/1988 | Raidel | |
| 5,002,305 | 3/1991 | Raidel | 280/711 |
| 5,020,820 | 6/1991 | Renner et al. | 280/439 |
| 5,058,916 | 10/1991 | Hicks | 280/711 X |
| 5,090,720 | 2/1992 | Heider et al. | 280/438.1 |
| 5,192,101 | 3/1993 | Richardson | 280/711 X |
| 5,230,528 | 7/1993 | Van Raden et al. | 280/711 X |

Primary Examiner—Margaret A. Focarino
Assistant Examiner—Florian Zeender
Attorney, Agent, or Firm—Harold E. Meier

[57] ABSTRACT

A frame isolation system is presented which enhances the ride quality of a terminal tractor. The isolation system includes an axle saddle provided with leading and trailing anti-torque links which permit the axle to move through a limited displacement to compensate for rough and uneven road surfaces. The terminal tractor includes a main frame and a rear axle, the axle saddle being rigidly coupled to the rear axle, and a resilient bumper positioned between the main frame and the axle saddle. The rear axle is also permitted to move through limited range of side to side oscillation because of the use of spherical bearings and ball joints between the anti-torque links and their respective connections with the axle saddle and the main frame.

9 Claims, 6 Drawing Sheets

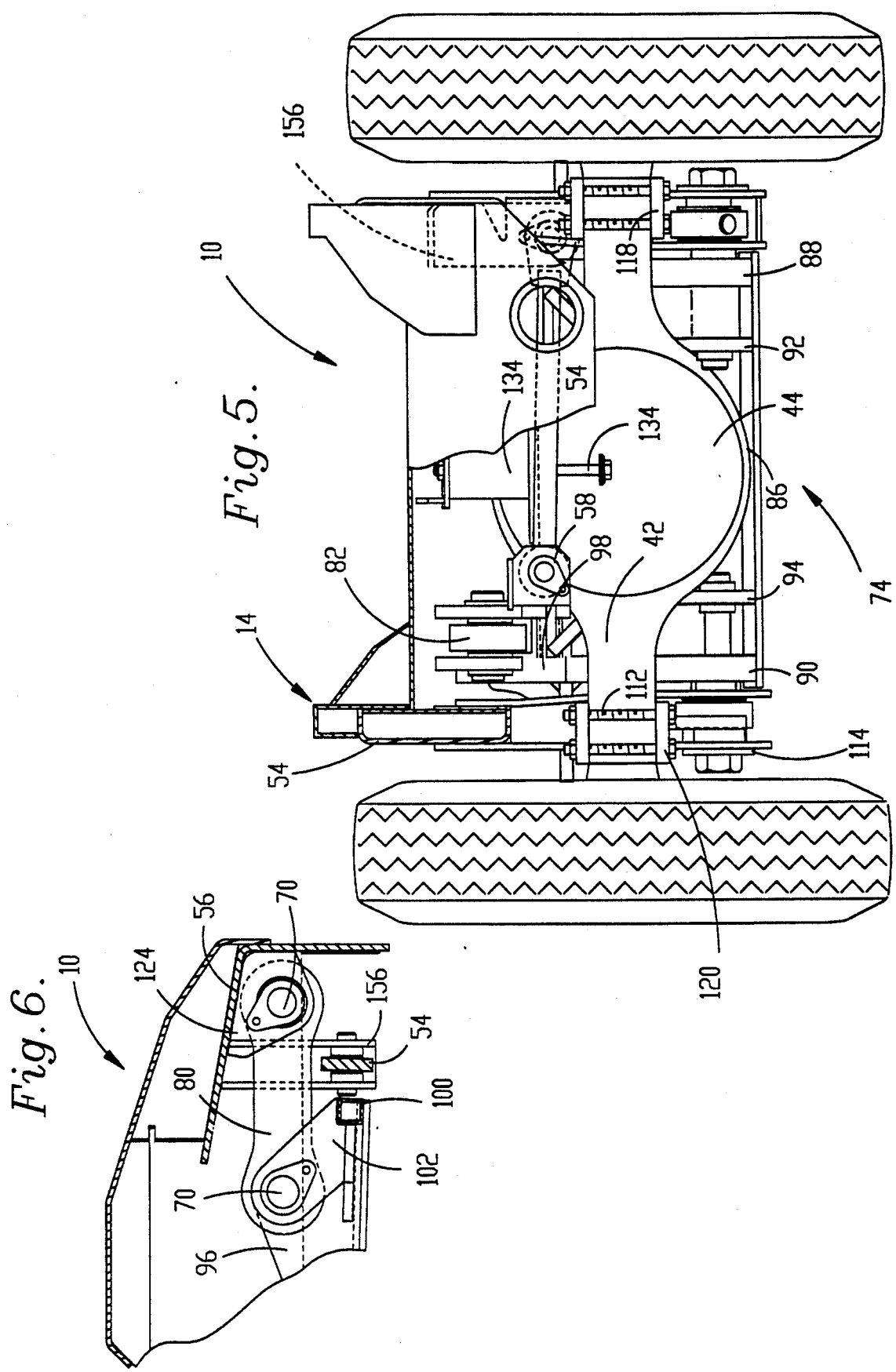

FRAME ISOLATOR FOR TERMINAL TRACTOR

BACKGROUND OF THE INVENTION

1. Field of the Invention

This invention concerns a load isolation system for a tractor which is used primarily for shuttling trailers attached to a fifth wheel boom. The isolation system serves to limit the shock ordinarily transferred from the rear axle to the main frame when the tractor moves over rough or uneven surfaces by including an axle saddle coupled to the main frame by anti-torque links.

2. Description of the Prior Art

Terminal tractors are vehicles which are typically used to shuttle trailers in a port, yard, or other terminal facility. The tractors attach and hold the trailers by a boom which carries a fifth wheel for coupling to the kingpin of the trailer. The boom is pivotally mounted to elevate a trailer carried by the fifth wheel so that the forward support legs are elevated above the ground. This permits the tractor to move the trailer without retracting the support legs which results in much more efficient operation. These tractors are used for only short trips and carry widely varying loads, and in order to reduce cost, are typically provided without dampening suspension systems, but instead the axle and fifth wheel are rigidly mounted to the frame. As a consequence, the cab and driver, as well as the engine, frame, and other components are subjected to continuous stress and strain as the tractor drives over the surface.

One effort to overcome these problems is shown in U.S. Pat. No. 5,020,820 to Renner, et al. This patent shows a suspension system for a tractor-trailer combination which uses an A type sub-frame connected to the main frame by a universally pivoting coupling at the front apex of the A-frame. The rear of the A-frame is coupled to the rear axle with the fifth wheel load being applied to the A-frame by the lift cylinders. Pneumatic cushions and shock absorbers are interposed between the A-frame and the main frame to cushion the tractor. While this tractor suspension presents certain advantages, certain problems have also been presented, such as overloading of the pneumatic cushions as a result of an overload on the fifth wheel, causing the cushions to burst. These problems include the necessity for providing plural suspension means such as pneumatic cushions and shock absorbers between the subframe and the main frame, maintenance difficulties in connection with the pneumatic cushions, clearance below the main frame of the tractor which may be limited by the forwardly extending A-frame, and stress on the driveshaft occasioned by the geometry of the A-frame. Additionally, the suspension system of the prior art requires an additional hydraulic system for controlling the amount of suspension for the load, and failed to provide any suspension effect when the fifth wheel boom was in a "down" position.

As a consequence, there has developed a real need for a rugged, reliable, load isolation system for a tractor which can avoid the aforementioned problems.

SUMMARY OF THE INVENTION

These problems have largely been overcome by the load isolation system for a terminal tractor as set forth in the present invention. The system hereof effectively isolates the main frame of the tractor from receiving all of the shock transmitted by the rear axle when moving over rough terrain with the fifth wheel in a raised position. This is accomplished by a system which includes only a single, centrally mounted isolation member, avoids the maintenance problems inherent in the prior art, provides good ground clearance, and avoids excessive translational movement of the driveshaft during up-and-down movement of the rear axle. It may also function without adding additional hydraulic circuits and provides a suspension effect when the boom is in a lowered position.

In order to accomplish these objects, the isolation system of the present invention includes an axle saddle which is bolted to the rear axle and coupled to the main frame by respective pairs of leading and trailing anti-torque links. The anti-torque links are preferably positioned outboard on the saddle, the anti-torque links extending forwardly only a small distance to avoid clearance problems which might otherwise be presented. The axle saddle is oriented with its greatest dimension extending side-to-side across the rear axle and receives therein the rear axle carrier. A pair of lift cylinders for lifting the fifth wheel boom are positioned between the boom and the axle saddle so that forces transmitted from the forward end of the trailer through the kingpin move through the fifth wheel and the lift cylinders to the axle saddle. The axle saddle also includes a rear deck which carries a resilient rubber bumper positioned substantially centrally across the width of the tractor. The bumper is positioned between the axle saddle and the main frame for isolating the main frame from shock transmitted to the axle saddle by movement of the rear saddle.

The tractor may thus easily move into position with the fifth wheel below the trailer kingpin and lift the boom so that the support legs are clear of the ground. The lift cylinders thus effectively carry much of the weight of the trailer load. As the trailer is driven to a different location, the forces generated by movement of the tractor-trailer combination over a rough surface are handled in large part by the axle saddle, with the resilient rubber bumper absorbing shock loads which would otherwise be transmitted to the main frame. The front and rear anti-torque links advantageously permit limited up and down movement of the rear axle relative to the main frame, as well as limited side-to-side rocking movement of the rear axle to the main frame. Thus, the load isolation system allows limited movement of the rear axle so that the axle may more readily conform to the road surface and isolate the cab and other tractor areas from shock. Further, the isolation system is configured to present good ground clearance as it is shortened relative to prior systems and thus closer to the rear axle. This structure and orientation also limits translational movement of the driveshaft on its supporting splined coupling as the axle moves through only a short displacement relative to the spliced coupling during up and down movement of the axle.

BRIEF DESCRIPTION OF THE DRAWINGS

FIG. 5 is an enlarged vertical cross-sectional view taken from a rear view of the invention hereof;

FIG. 6 is an enlarged vertical cross-sectional view taken along line 6—6 of FIG. 3.

DESCRIPTION OF THE PREFERRED EMBODIMENT

Figure 1:
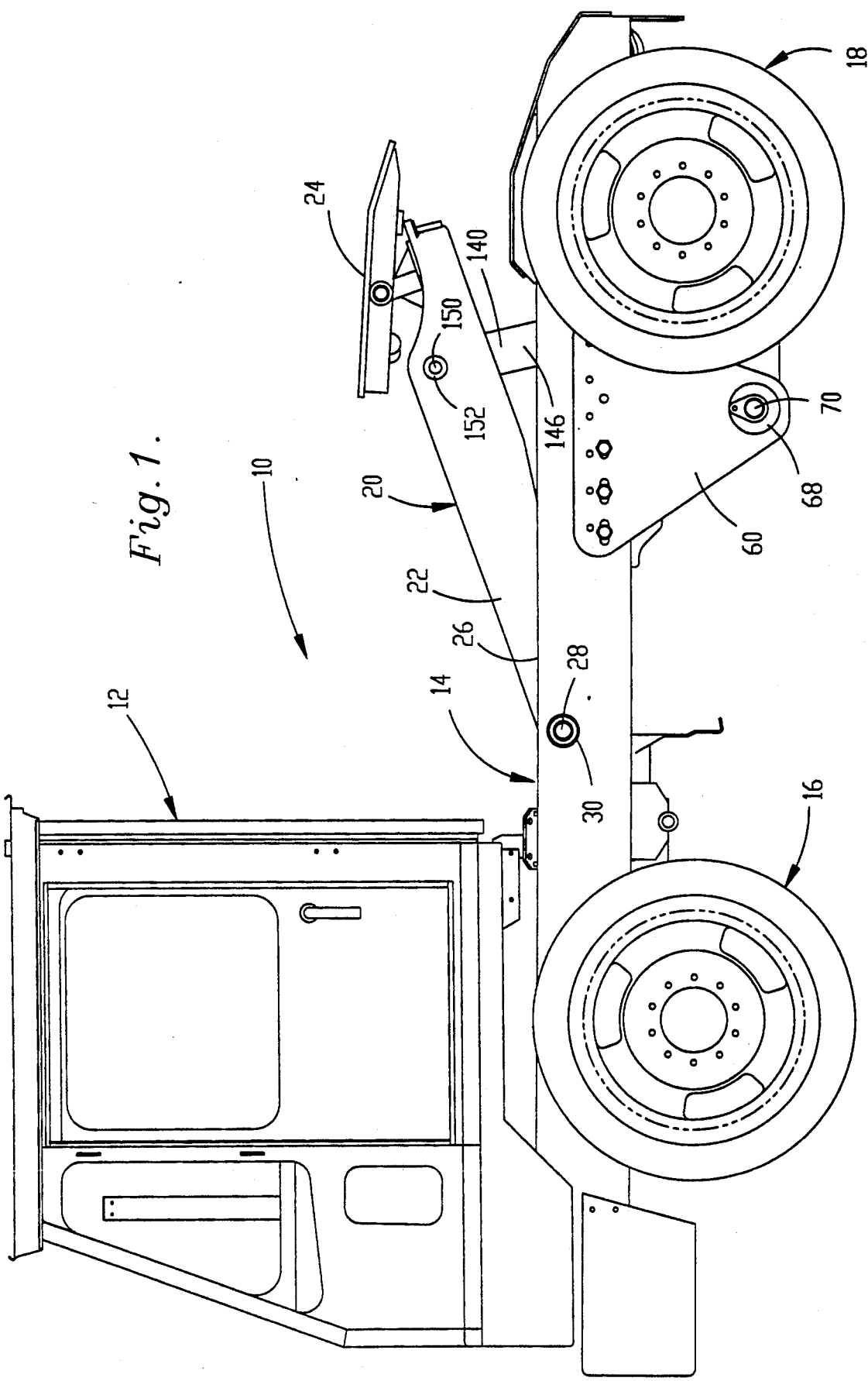
FIG. 1 is a right side elevational view of a terminal tractor having a load isolation system in accordance with the present invention with the fifth wheel boom in an elevated position.

Referring now to the drawing, a terminal tractor 10 incorporating the present invention includes a cab 12 for enclosing the driver and covering the engine positioned therebeneath, a main frame 14 supported by a front axle assembly 16 and a rear axle assembly 18, and a fifth wheel assembly 20. The fifth wheel assembly 20 includes a boom 22 and a fifth wheel 24 adapted for receiving the kingpin of a trailer. The boom 22 is pivotally mounted to the main frame 14 at its forward end 26 by pivot pins 28 inserted through corresponding bearings 30 positioned in the main frame 14.

Figure 3:
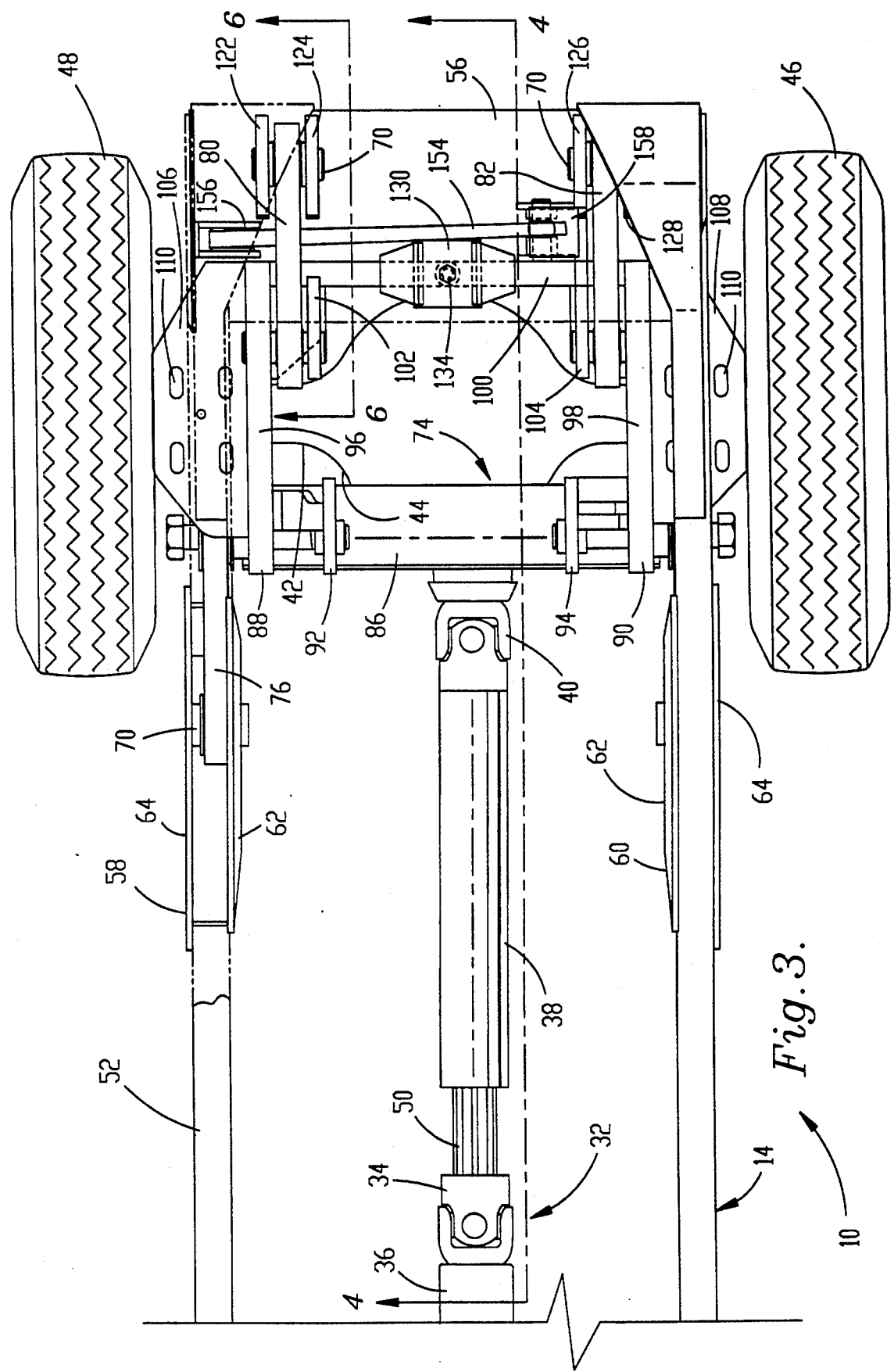
FIG. 3 is an enlarged fragmentary top plan view of the load isolation system hereof with the fifth wheel boom, lift cylinders, portions of the main frame and the resilient bumper removed for clarity.

The engine for driving the tractor 10 is positioned beneath the cab, which may be tilted forwardly for access to the engine. A drivetrain 32 extends rearwardly from the engine and is better shown in FIG. 3, the drivetrain including a universal coupling 34 mounted at the rear of the engine transmission 36, a driveshaft 38, a rear universal coupling 40, and a rear axle 42. The rear axle 42 includes axle carrier 44 (which houses the rear wheel differential drive) and extends transverse to the driveshaft 38 as is conventional to rear wheels 46 and 48. The universal coupling 34 includes a splined portion 50 which mates with driveshaft 38 which is internally splined, whereby torque may be transmitted from the universal coupling 34 to the driveshaft 38 while the driveshaft may move translationally along the splined portion 50.

Figure 4:
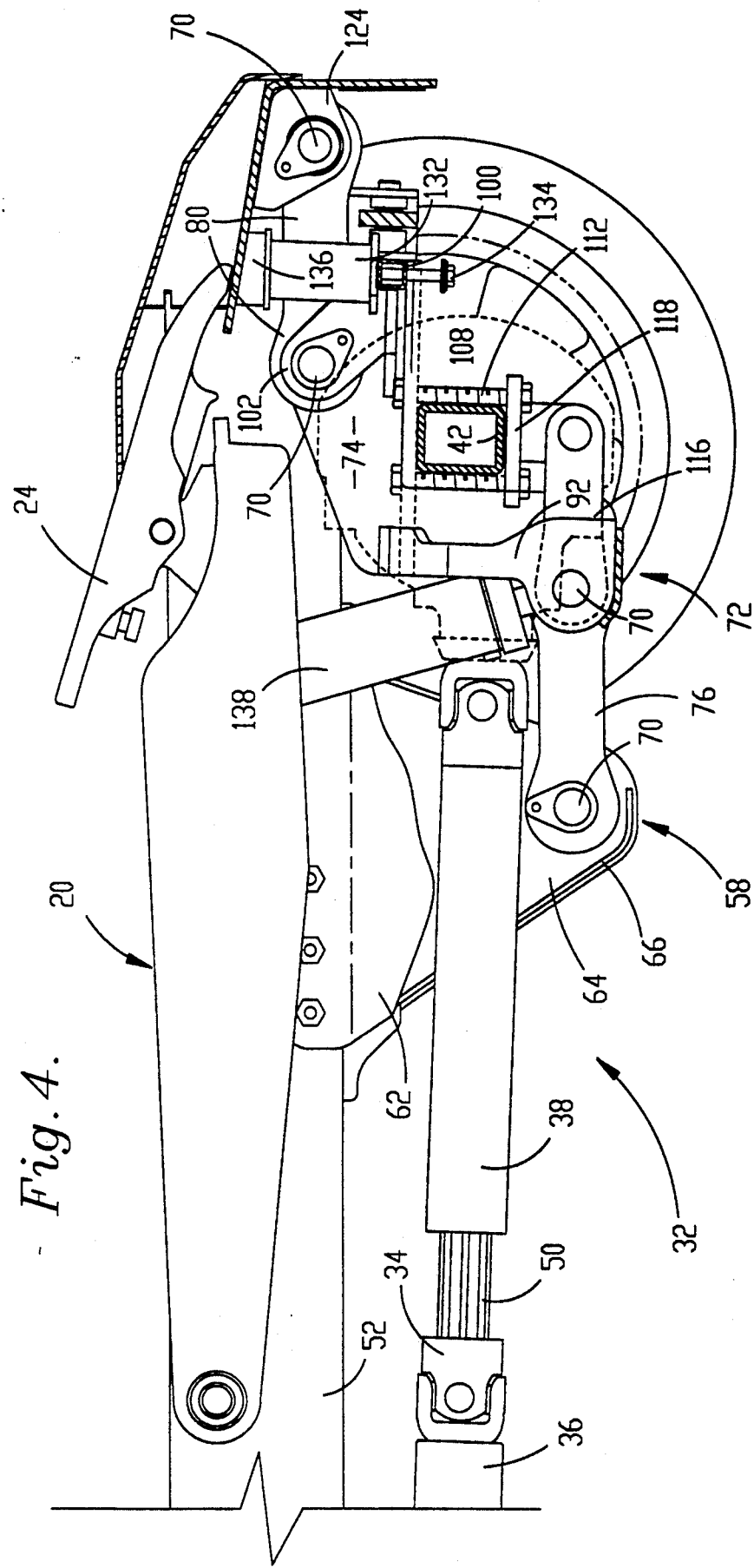
FIG. 4 is an enlarged vertical cross section view of the invention hereof taken through line 4—4 of FIG. 3.
Figure 7:
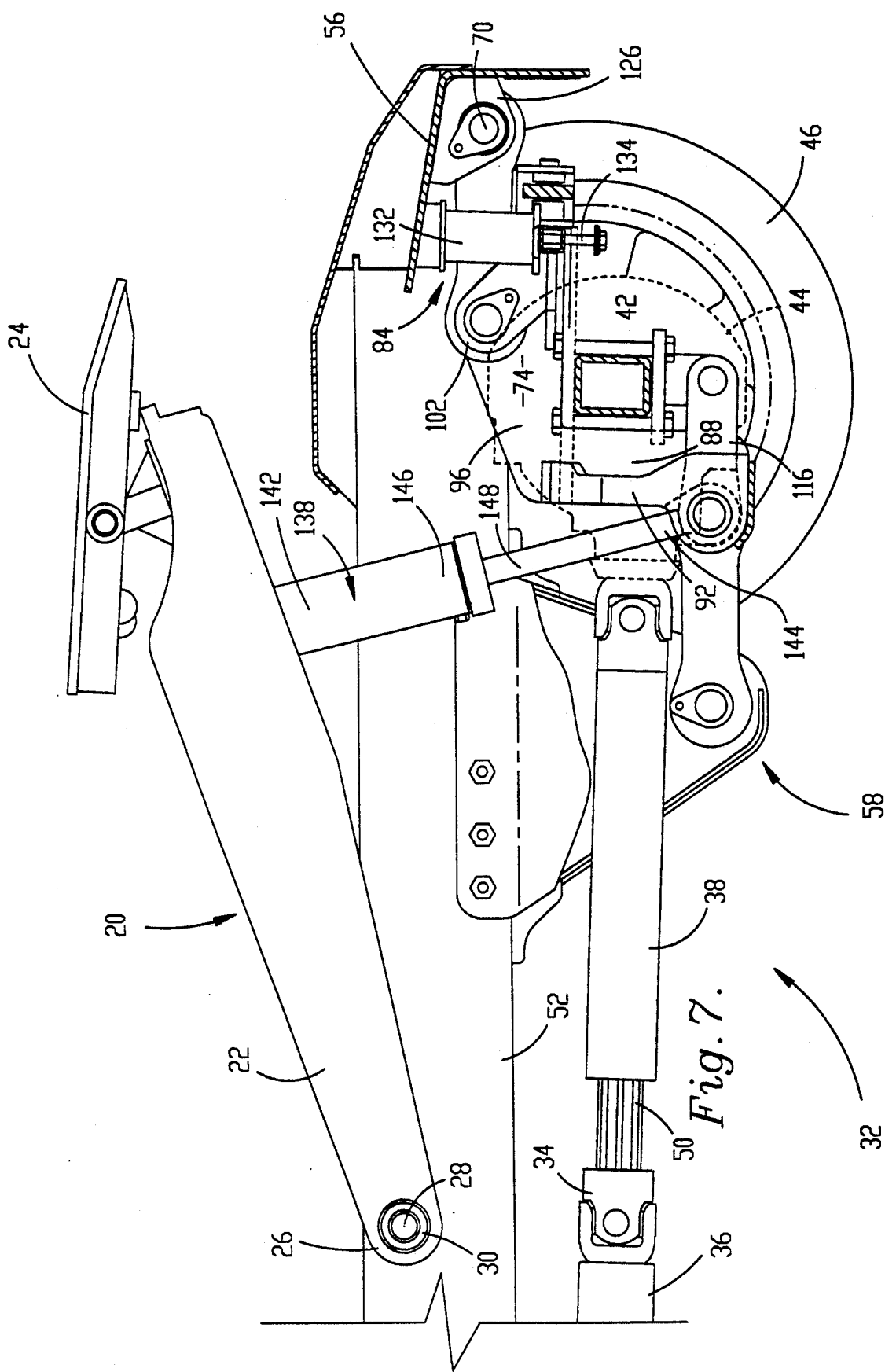
FIG. 7 is an enlarged vertical cross-sectional view similar to FIG. 4 but showing the lift cylinders extended to elevate the fifth wheel boom.

The main frame 14 includes elongated rails 52 and 54 connected by, for example, rear cross rail 56. Main frame 14 includes spaced-apart hangars 58 and 60 secured to the main frame 14 by bolts, as shown, or by welding, if desired. Each of the hangars includes laterally spaced side plates 62 and 64 interconnected by a face plate 66. Each side plate mounts a bearing 68 for holding a link pin 70 therein, as shown in FIG. 4.

A load isolator 72 is provided which includes an axle saddle 74, a leading pair of anti-torque links 76 and 78, a trailing pair of anti-torque links 80 and 82, and bumper group 84 located between the axle saddle 74 and the rear cross rail 56 of the main frame 14.

In greater detail, the axle saddle 74 includes a crossbeam 86 extending laterally within and below the main frame 14, upright arms 88 and 90 secured to the lateral ends of the crossbeam 86, struts 92 and 94 positioned in spaced relationship inboard of arms 88 and 90, respectively, and also secured to the crossbeam 86 at their lower ends as shown in FIG. 5. The struts 92 and 94 angle outwardly at their respective upper ends and are welded to the arms 88 and 90. The upper ends of the arms 88 and 90 then extend rearwardly as shoulders 96 and 98. Shelf 100 also forms a part of the axle saddle 74 and extends transversely between the main frame 14 and is welded to the rearward ends of the shoulders 96 and 98. A pair of support knees 102 and 104 are positioned in spaced relationship inboard of the shoulders 96 and 98 and receive therebetween the forward ends of the trailing anti-torque links 80 and 82. The axle saddle 74 mounts to the rear axle 42 by upper mounting flanges 106 and 108 extending outwardly from shoulders 96 and 98, each of the mounting flanges 106 and 108 being provided with a set of four holes 110 for receiving axle mounting bolts 112 therethrough. In addition, axle mounting links 114 and 116 are pivotally mounted to axle saddle 74 at their front ends and pivotally coupled to axle mounting brackets 118 and 120 at their rear ends, the axle mounting brackets also being provided with holes for receiving the axle mounting bolts 112 therethrough.

Each of the anti-torque links 76, 78, 80 and 82 is provided with a spherical bearing, the bearing being positioned on a corresponding ball joint on pivot pins 70. The ball joints are thus located on the pivot pins 70 so that the ball joints are positioned between the side plates 62 and 64, between arm 88 and strut 92, between arm 90 and strut 94, between shoulder 96 and support plate 102, and between shoulder 98 and support plate 104.

In addition, rear cross rail 56 carries mounting ears 122 and 124 for receiving the rearward end of trailing anti-torque links 80 on a pivot pin 70 extending therebetween, and similarly mounting ears 126 and 128 for receiving the rearward end of trailing anti-torque link 82 on a pivot pin 70 extending therebetween. Again, the pins 70 include ball joints positioned between the ears 122 and 124, and also 126 and 128 for receiving thereon spherical bearings carried by the rear ends of anti-torque links 80 and 82, respectively.

At approximately the midpoint laterally along shelf 100, bumper group 84 is positioned for isolating the main frame 14 against shock. The bumper group 84 includes bumper mount 130, a resilient bumper 132 preferably made of hard natural or synthetic rubber, and restraining bolt 134 for limiting the rebound which can be generated by the bumper 132. The bumper 132 is tubular whereby the restraining bolt 134 passes through the bumper and carries locator bushings for holding the bumper 132 in position. A boss 136 is welded to and depends from the rear cross rail 56 for engaging the top surface of the bumper 132. In typical applications, the bumper will have an upright dimension in the vicinity of about 7 inches.

Lift cylinders 138 and 140 each present an upper end 142 and a lower end 144, the lift cylinders including a barrel 146 and an extensible arm 148. The upper end 142 of each lift cylinder is pivotally mounted to the boom 22 by a pin 150 located within a bearing 152, and the lower end 144 of each lift cylinder is pivotally mounted to the axle saddle 74 by pivot pin 70 and located between the arms 88 and 90 and the struts 92 and 94 adjacent thereto.

Figure 2:
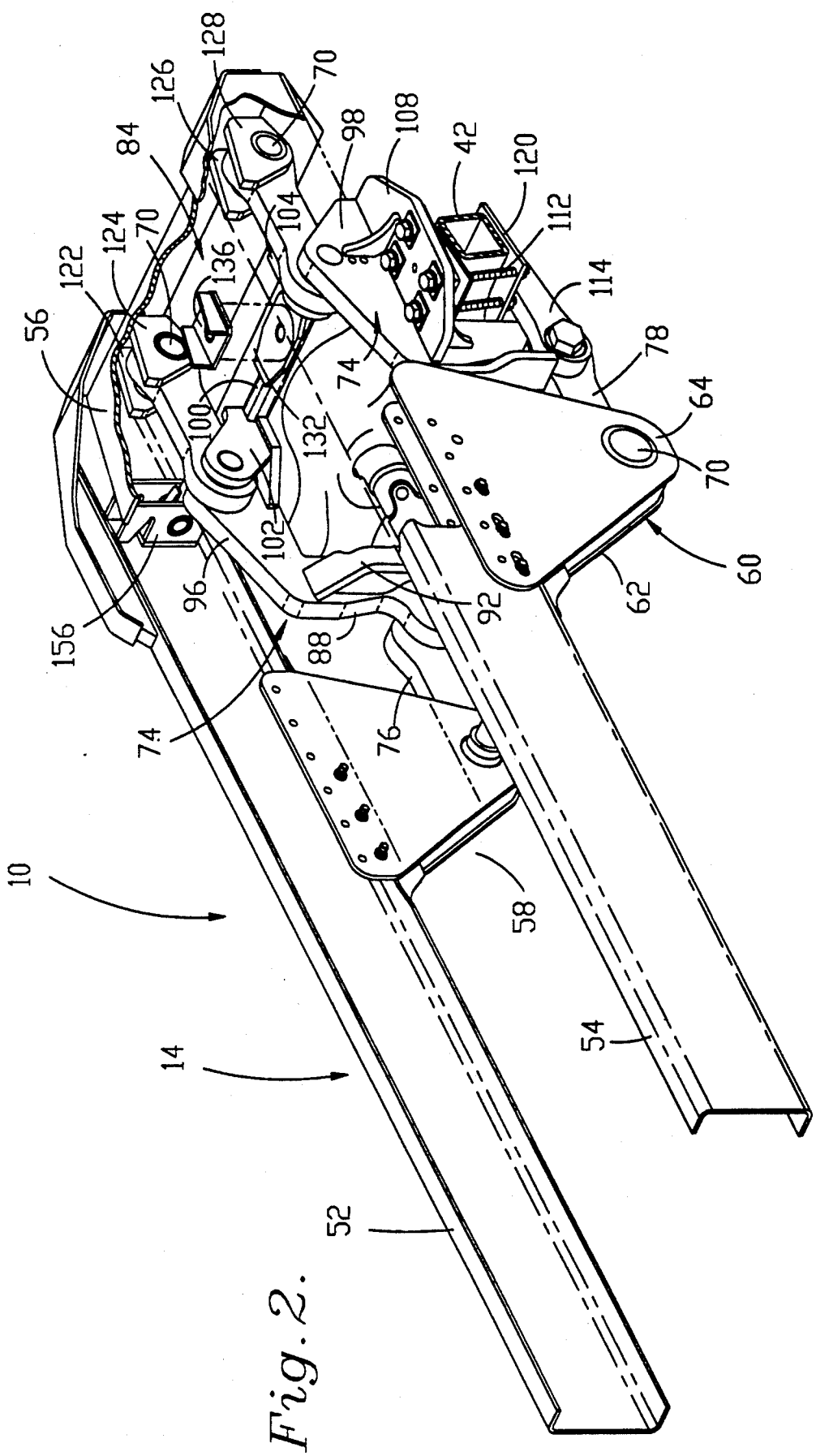
FIG. 2 is a perspective view of the main frame and load isolator system showing the axle saddle pivotally connected to the anti-torque links and rigidly coupled to the rear axle, with the resilient bumper shown in phantom.

A track rod 154 is pivotally attached to a track rod bracket 156 attached to the rail 52 of main frame 14 and also to track rod coupler 158 attached to the shelf 100 of axle saddle 74. The track rod 154 serves to maintain lateral alignment of the rear axle while permitting the rear axle 42 to move up and down and oscillate about an axis extending substantially through the drive shaft 38. Suitable pivot pins and bearings are provided for retaining the track rod within the respective bracket and coupling and for permitting appropriate pivoting motion as may be seen in FIGS. 2, 5 and 6.

When the tractor 10 is operating, the load isolator 72 permits the rear axle 42 to move up and down through a limited displacement while the load applied to the fifth wheel 24 is largely transmitted through the lift cylinders 138 and 140 to the axle saddle 74 and not directly to the main frame 14. As motive force is applied to the rear wheels through the drivetrain 32, the leading anti-torque links 76 and 78 and the trailing anti-torque links 80 and 82 prevent the rear axle 42 from twisting and allow the torque applied through the drivetrain to drive the rear wheels. The axle saddle 74 is firmly affixed to the rear axle and also to the leading and trailing anti-torque links so that the axle saddle prevents the rear axle from any twisting motion.

As the rear axle encounters various rough road areas such as holes or bumps, the anti-torque links permit a limited amount of up and down motion, with this motion being cushioned as the bumper mount 130 moves upwardly toward the boss 136 and compresses the bumper 132 therebetween. The bumper 132, being of hard but resilient rubber, has limited yielding to such compression and thus prevents the shock transmitted to the rear axle 42 from being carried to the main frame 14 through rear cross rail 56. Advantageously, the positioning of the anti-torque links with a pair oriented in a plane below the rear axle and the trailing pair oriented in a horizontal plane above the rear axle keeps the axle carrier 44 and thus the driveshaft 38 moving substantially in a path which is more or less arcuate about the universal coupling 34. This in turn prevents the driveshaft 38 from excessive translation movement along spline portion 50, thereby limiting stress on the universal coupling 34 and the driveshaft 38 when the drivetrain 32 is operational to transmit a driving force to the rear axle 42 when the axle carrier 44 is moving up and down.

The load isolator 72 hereof also permits rear axle 42 to oscillate about an axis extending through the driveshaft 38 by virtue of the ball joints and spherical bearings coupling the anti-torque links to the axle saddle 74, the mounting ears 122 through 128, and the hangers 58 and 60. Because the side plate 62 and 64 of the hangers and because of the limited spacing between the mounting ears 122 and 124 and 126 and 128, only limited oscillation is permitted, but such oscillation nonetheless serves to aid in permitting the axle 42 to move independently along the road. This oscillation is further enhanced by the use of the single, laterally centrally positioned bumper 132, so that the bumper 132 essentially functions as a fulcrum about which the rear axle is free to oscillate, again limited by the travel of the respective anti-torque links.

It may be appreciated that the geometry of the present system is such that the length of the anti-torque links 76 and 78 may be relatively short and thus the ground clearance of the tractor 10 hereof is not substantially affected by the inclusion of the present load isolator 72. Further, the load isolator of the present invention is operable both when the fifth wheel assembly 20 is in an elevated as well as a retracted position. When the fifth wheel assembly 20 is elevated by lift cylinders 138 and 140, a substantial portion of the load carried thereby is supported by the rear axle through the axle saddle 74 and the lift cylinders 138 and 140. Thus, whether the fifth wheel assembly 20 is elevated or lowered, the bumper group 84 affectively attenuates any shock transmitted to the main frame 14 by the rear axle. In the event the resilience of the bumper 132 is so great as to cause excessive separation between the boss 136 and the bumper mount 130, the restraining bolt 134 prevents the bumper 132 from being dislocated or moved out of alignment.

We claim:

1. A load isolation system for a tractor comprising:
a main frame;
an axle oriented transversely to said main frame and mounting wheels thereon;
a fifth wheel assembly including a boom pivotally mounted to said main frame;
means for supporting said boom through a predetermined path of movement;
an axle saddle coupled to the axle and the main frame, the axle saddle comprises:
shoulder means for supporting the axle to receive a load applied to said fifth wheel, said shoulder means including first and second shoulder members;
a plurality of substantially parallel spaced anti-torque link members pivotally interconnecting said shoulder means to said main frame;
means for connecting the axle to the shoulder means;
crossbeam means positioned laterally within and below the main frame and rigidly fastened between the first and second shoulder members of the shoulder means; and
means for pivotally mounting the means for supporting to the crossbeam means.

2. The load isolation system as set forth in claim 1, wherein said main frame includes parallel spaced side rails and wherein the plurality of anti-torque link members includes a leading pair of anti-torque links each pivotally mounted at one end to the crossbeam means and at a second end to one of the spaced side rails.

3. The load isolation system as set forth in claim 2, including means for pivotally mounting the leading pair of anti-torque links below the axle.

4. A load isolation system as set forth in claim 2, wherein said main frame includes a pair of laterally spaced, generally depending hangers for mounting said leading pair of anti-torque links to said main frame.

5. A load isolation system as set forth in claim 4, wherein said main frame includes a pair of laterally spaced longitudinally extending elongated rails, at least one of said depending hangers being mounted on each of said rails, and wherein each of said leading pair of anti-torque links is oriented in substantial vertical alignment with said elongated rails.

6. The load isolation system as set forth in claim 1, wherein said main frame includes a cross rail and wherein the plurality of anti-torque link members includes a trailing pair of anti-torque links each pivotally mounted at one end to a rearward end of the shoulder means and at a second end to the cross rail of said main frame.

7. The load isolation system as set forth in claim 6, including means for pivotally mounting the trailing pair of anti-torque links above the axle.

8. The load isolation system as set forth in claim 1, further comprising a resilient elastomeric bumper mounted intermediate to the axle saddle and the main frame.

9. The load isolation system as set forth in claim 1, wherein the plurality of anti-torque link members includes an axle mounting pair of anti-torque links pivotally mounted to the crossbeam means and the axle.

* * * * *